(12) United States Patent
Ueda

(10) Patent No.: US 11,472,374 B2
(45) Date of Patent: Oct. 18, 2022

(54) VEHICLE CONTROL SYSTEM

(71) Applicant: Toyota Jidosha Kabushiki Kaisha, Toyota (JP)

(72) Inventor: Kazuhiko Ueda, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 16/680,954

(22) Filed: Nov. 12, 2019

(65) Prior Publication Data

US 2020/0148171 A1    May 14, 2020

(30) Foreign Application Priority Data

Nov. 14, 2018   (JP) .............................. JP2018-214141

(51) Int. Cl.
    *B60W 40/02*    (2006.01)
    *B60S 1/08*    (2006.01)
    *G05D 1/02*    (2020.01)

(52) U.S. Cl.
    CPC ........... *B60S 1/0822* (2013.01); *B60W 40/02* (2013.01); *G05D 1/021* (2013.01)

(58) Field of Classification Search
    CPC ........ B60S 1/04; B60S 1/0488; B60S 1/0822; B60W 40/02; G05D 1/021
    See application file for complete search history.

(56) References Cited

U.S. PATENT DOCUMENTS

| | | | |
|---|---|---|---|
| 9,410,491 B2 | 8/2016 | Chang | |
| 2003/0138132 A1 | 7/2003 | Stam et al. | |
| 2004/0218401 A1 | 11/2004 | Okubo et al. | |
| 2005/0278093 A1* | 12/2005 | Kameyama | B60R 16/0373 701/49 |
| 2006/0177098 A1 | 8/2006 | Stam | |
| 2009/0010494 A1 | 1/2009 | Bechtel et al. | |

(Continued)

FOREIGN PATENT DOCUMENTS

| | | |
|---|---|---|
| JP | 2006-73013 A | 3/2006 |
| JP | 2009-151522 A | 7/2009 |

(Continued)

OTHER PUBLICATIONS

Office Action dated Feb. 16, 2022 for U.S. Appl. No. 16/680,807.

(Continued)

*Primary Examiner* — Benyam Haile
(74) *Attorney, Agent, or Firm* — Dinsmore & Shohl LLP

(57) ABSTRACT

A vehicle includes a wiper switch that manually operates a wiping mode of a windshield wiper. The vehicle control system includes a first controller configured to execute an automated driving of the vehicle, and a second controller configured to control the wiping mode of the windshield wiper based on a request from the first controller or operation information of the wiper switch. The first controller transmits an auto-wiper request to the second controller during execution of the automated driving. Here, the auto-wiper request is a request for executing an auto-wiper process for automatically switching the wiping mode of the windshield wiper according to an external environment. The second controller executes the auto-wiper process when the auto-wiper request is received from the first controller in a state where the wiper switch is operated to the wiper-off position.

2 Claims, 5 Drawing Sheets

(56) References Cited

U.S. PATENT DOCUMENTS

| | | |
|---|---|---|
| 2012/0116632 A1 | 5/2012 | Bechtel et al. |
| 2013/0345935 A1 | 12/2013 | Chang |
| 2015/0002015 A1 | 1/2015 | Hayakawa et al. |
| 2015/0073621 A1 | 3/2015 | Kida |
| 2017/0235306 A1 | 8/2017 | Seki |
| 2017/0322558 A1 | 11/2017 | Teshima et al. |
| 2017/0332010 A1 | 11/2017 | Asakura et al. |
| 2018/0111628 A1 | 4/2018 | Tamagaki et al. |
| 2018/0181128 A1* | 6/2018 | Urano ............... G01C 21/3492 |
| 2019/0039617 A1 | 2/2019 | Miura et al. |
| 2020/0150658 A1 | 5/2020 | Ueda |
| 2020/0150702 A1 | 5/2020 | Ueda |
| 2020/0198586 A1* | 6/2020 | Doi ..................... B60S 1/0818 |

FOREIGN PATENT DOCUMENTS

| | | |
|---|---|---|
| JP | 201419390 A | 2/2014 |
| JP | 201424368 A | 2/2014 |
| JP | 2015-54604 A | 3/2015 |
| JP | 201688201 A | 5/2016 |
| JP | 2016196285 A | 11/2016 |
| JP | 2017-146723 A | 8/2017 |
| JP | 2017138724 A | 8/2017 |
| JP | 2017-202768 A | 11/2017 |
| JP | 2018-132533 A | 8/2018 |

OTHER PUBLICATIONS

U.S. Appl. No. 16/680,807, filed Nov. 12, 2019 Inventor: Kazuhiko Ueda.

U.S. Appl. No. 16/680,944, filed Nov. 12, 2019 Inventor: Kazuhiko Ueda.

Non-Final Office Action dated May 24, 2022, for related U.S. Appl. No. 16/680,944, filed Nov. 12, 2019.

Notice of Allowance dated Jul. 21, 2022, to U.S. Appl. No. 16/680,807, filed Nov. 12, 2019.

* cited by examiner

VEHICLE CONTROL SYSTEM

CROSS-REFERENCE TO RELATED APPLICATION

The present application is based on, and claims priority from, Japanese Patent Application Serial Number 2018-214141, filed on Nov. 14, 2018, the disclosure of which is hereby incorporated by reference herein in its entirety.

FIELD

The present disclosure relates to a vehicle control system, and more particularly, to a vehicle control system for controlling an operation of a windshield wiper during an automated driving of a vehicle.

BACKGROUND

Japanese Patent Laid-Open No. 2018-132533 discloses a vehicle warning device capable of switching between a manual operation by a driver and an automated driving by an in-vehicle computer. In the automated driving at level 3 or higher in the level definition of SAE (Society of Automotive Engineers), the second task such as the operation of the portable terminal is permitted to the driver. In this technique, when the driver is caused to perform the manual operation during the automated driving in which the second task is permitted, warning information for causing the driver to start the manual operation is displayed on a screen of a portable terminal displaying a content together with the content.

SUMMARY

A wiper switch of a vehicle is generally installed in a steering column or the like which is easy for a driver to operate. Therefore, the driver seated in the driver's seat may unintentionally touch the wiper switch. If a wiping mode of a windshield wiper is switched by such an erroneous operation, there is a possibility that the windshield wiper does not operate at the time of rainfall during the automated driving. In this case, it is difficult to continue the automated driving because the front visibility may not be clearly obtained, and a request for switching to a manual operation is issued. However, in a situation where the forward visibility is not obtained, the driver may not change driving with a sense of security. Such a problem of erroneous operation of the wiper switch becomes particularly conspicuous in the automated driving at level 3 or higher in which the second task is permitted.

The present disclosure has been made in view of the above-mentioned problems, and an object of the present disclosure is to provide a vehicle control system capable of ensuring a forward visibility during an automated driving by optimizing an operation of a windshield wiper during the automated driving.

In order to solve the above problems, a first disclosure is applied to a vehicle control system installed on a vehicle.

The vehicle includes a windshield wiper switch for manually operating a wiping mode of a wiper installed on a body. The wiper switch includes a wiper-on position for driving the windshield wiper and a wiper-off position for stopping the windshield wiper. The vehicle control system includes a first controller and a second controller. The first controller is configured to execute an automated driving of the vehicle. The second controller is configured to control the wiping mode of the windshield wiper based on a request from the first controller or operation information of the wiper switch. The first controller is configured to transmit, during execution of the automated driving, an auto-wiper request for executing an auto-wiper process for automatically switching the wiping mode of the windshield wiper according to an external environment to the second controller. The second controller is configured to execute the auto-wiper process when the auto-wiper request is received from the first controller in a state where the wiper switch is operated to the wiper-off position.

A second disclosure has the following further features in the first disclosure.

The first controller is configured to transmit, during execution of the automated driving, a specific operation rejection request for executing a specific operation rejection process for rejecting a control of the windshield wiper based on the specific operation to the second controller. The specific operation includes an operation of the wiper switch to the wiper-off position. The second controller is configured to execute the specific operation rejection process when the specific operation rejection request is received from the first controller.

A third disclosure further has the following features in the first disclosure.

The wiper switch further includes an intermittent position for intermittently driving the windshield wiper. The second controller is configured to execute the auto-wiper process when an auto-wiper request is received from the first controller in a state where the wiper switch is operated to the intermittent position.

A fourth disclosure further has the following features in the third disclosure.

The first controller is configured to transmit, during execution of the automated driving, a specific operation rejection request for performing specific operation rejection process for rejecting a control of the windshield wiper based on a specific operation to the second controller. The specific operation includes an operation of the wiper switch to the intermittent position or the wiper-off position. The second controller is configured to execute the specific operation rejection process when the specific operation rejection request is received from the first controller.

According to the vehicle control system of the first disclosure, even if the wiper switch is operated to the wiper-off position, the auto-wiper process may be executed during the automated driving. As a result, since the front visibility is secured in the automatic driving, the driver may change the driving with a sense of security.

According to the second disclosure, it is possible to reject the control of the windshield wiper by the specific operation including the operation of the wiper switch to the wiper-off position during the automated driving. As a result, it is possible to prevent the driver from erroneously operating the wiper switch and stopping the windshield wiper during the automated driving. As a result, since the front visibility is secured in the automatic driving, the driver may change the driving with a sense of security.

According to the third disclosure, even if the wiper switch is operated to the intermittent position, the auto-wiper process may be executed during the automated driving. As a result, it is possible to perform the wiping operation according to the amount of rainfall in the automated driving, so that it is possible to always secure the front visibility.

According to the fourth disclosure, it is possible to reject the control of the windshield wiper by the specific operation including the operation of the wiper switch to the intermittent position during the automated driving. As a result, it is possible to prevent the driver during automated driving from operating the wiper switch erroneously and driving the windshield wiper intermittently. As a result, since the front visibility is secured in the automatic driving, the driver may change the driving with a sense of security.

As described above, according to the present disclosure, since the operation of the windshield wiper during the automated driving is optimized, it is possible to secure the front visibility during the automated driving. As a result, the driver may change the driving with a sense of security.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

1. First Embodiment 1-1. Overall Configuration of Vehicle Control System

Figure 1:
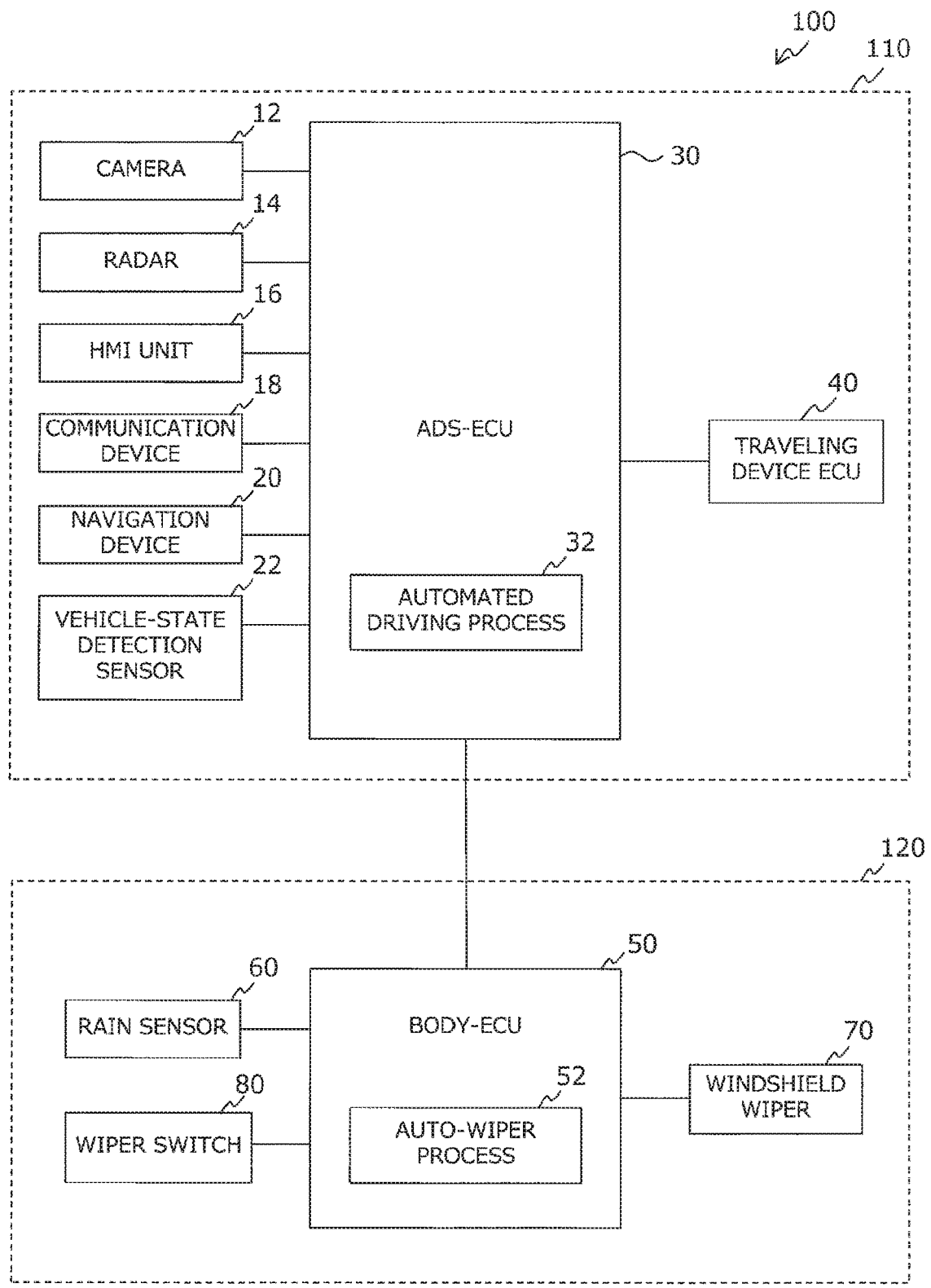
FIG. 1 is a block diagram showing an example of a configuration of a vehicle control system according to a first embodiment.

FIG. 1 is a block diagram showing a configuration example of a vehicle control system according to the first embodiment. The vehicle control system 100 shown in FIG. 1 is installed on a vehicle. Hereinafter, the vehicle on which the automated driving system is installed is also referred to as "vehicle M1". Examples of the vehicle M1 include an automobile that uses an internal combustion engine as a power source, an electric automobile that uses an electric motor as a power source, and a hybrid automobile that includes an internal combustion engine and an electric motor. The electric motor is driven by a batter) such as a secondary battery, a hydrogen fuel cell, a metal fuel cell, an alcohol fuel cell, or the like.

As shown in FIG. 1, the vehicle control system 100 includes a first control system 110 and a second control system 120. The first control system 110 is a system for executing automated driving of the vehicle M1. The second control system 120 is a system for controlling an operation of a windshield wiper 70 of the vehicle M1. Hereinafter, the configuration of these systems will be described.

The first control system 110 includes an electronic control unit (hereinafter, also referred to as "ADS-ECU") 30 for automated driving control. The first control system 10 includes a cameras 12 a radar 14, an HMI unit 16, a communication device 18, a navigation device 20, and a vehicle-state detection sensor 22, all of which are connected to inputs of the ADS-ECU 30. Furthermore, the first control system 110 includes an electronic control unit (hereinafter also referred to as "travelling device ECU") 40 for a traveling device that is connected to an output-side of the ADS-ECU 30.

The camera 12 functions as information acquisition means for acquiring peripheral information of the vehicle M1, for example, a front camera for capturing an image of the front of the vehicle M1, a left-rear camera for capturing an image of the left-rear of the vehicle M1, and a right-rear camera for capturing an image of the right-rear of the vehicle M1. The images picked up by the cameras 12 are transmitted as image data to the ADS-ECU 30 at any time, and are subjected to image processes on the respective image data in the ADS-ECU 30. The peripheral information acquired by the camera 12 is, for example, position information and white line information of peripheral vehicles traveling around the vehicle M1, and road information such as signal information. The peripheral information acquired by the cameras 12 is also transmitted to a BODY-ECU 50 (described later) at any time.

The radar 14 is, for example, a laser radar, a millimeter wave radar, or the like, and functions as information acquisition means for acquiring peripheral information of the vehicle M1. The radar 14 transmits a laser wave or the like to the front and the rear of the vehicle M1, respectively, and receives the reflected wave to acquire peripheral information of the vehicle M1. The peripheral information acquired by the radar 14 includes, for example, information on the presence or absence of a peripheral vehicle, distance to the peripheral vehicle, angle (i.e., relative position) and speed (relative speed) information, and positional information of a utility pole, a building, or the like. The respective pieces of information detected by the radar 14 are transmitted to the ADS-ECU 30 at any time.

The HMI unit 16 is an interface for providing information to the driver of the vehicle M1 and for receiving information from the driver. For example, the HMI unit 16 includes an input device, a display device, and a speaker. Examples of the input device include a touch panel, a keyboard, a switch, and a button. The driver may input information such as a destination using the input device to the HMI unit 16. The information input from the driver is transmitted to the ADS-ECU 30 at any time.

The communication device 18 functions as an information acquisition unit that receives peripheral information from a roadside system provided on a road via an antenna provided in the vehicle M1. The roadside system is, for example, a beacon device that transmits, for example, traffic jam information, traffic information by lane, regulation information such as a stop, traffic situation information of a blind spot positions, and the like. The communication device 18 also functions as an information acquiring means for communicating with a peripheral vehicle in the vicinity of the vehicle M1, directly via an antenna, or via a relay station (not shown). The peripheral information acquired here includes, for example, position information and speed information of peripheral vehicles. The respective pieces of information received by the communication device 18 are transmitted to the ADS-ECU 30 at any time.

The navigation device 20 detects the current position of the vehicle M1 from a GPS satellite via an antenna. The navigation device 20 also detects the traveling speed of the vehicle M1 and guides the vehicle to the destination by using the GPS, a speed sensor, a gyroscope, and the like. The navigation device 20 incorporates map data including detailed road information. The map data includes, for example, information on the shape of the road, the number of lanes, the lane width, and the like. The present position information, the road information, and the like acquired by the navigation device 20 are transmitted to the ADS-ECU 30 at any time.

The vehicle-state detection sensor 22 detects the traveling state of the vehicle M1. Examples of the vehicle-state detection sensor 22 include a vehicle speed sensor, a lateral acceleration sensor, and a yaw rate sensor. The information detected by the vehicle-state detection sensor 22 is transmitted to the ADS-ECU 30 at any time.

The ADS-ECU 30 corresponds to a first controller of the vehicle control system 100. Typically, the ADS-ECU 30 is a microcomputer including a processor, memories, and input/output interfaces. The ADS-ECU 30 executes the automated driving for automatically driving the vehicle M1. The ADS-ECU 30 includes an automated driving processing unit 32 as a functional block for executing the automated driving of the vehicle M1. The automated driving processing unit 32 receives information necessary for the automated driving from various information acquisition means via the input/output interface. Then, the automated driving processing unit 32 executes the automated driving based on the received information. Specifically, the automated driving processing unit 32 calculates a travel plan of the vehicle M1 and outputs information to the traveling device ECU 40 such that the vehicle M1 travels in accordance with the travel plan.

The traveling device ECU 40 is a microcomputer having the same configuration as the ADS-ECU 30. The traveling device ECU 40 is composed of a plurality of ECUs. These ECUs control various types of traveling devices (not shown) for automated traveling the vehicle M1 in accordance with various types of information inputted from the ADS-ECU 30. These traveling devices include a driving force output device, a steering device and a braking device. The driving force output device is a power source for generating a driving force. The steering device steers the wheels. The braking device generates a braking force.

A known technique is applied to the automated driving executed by the ADS-ECU 30. Therefore, descriptions of the functions of the ADS-ECU 30 related to the automated operation are provided only in the above description. The details of the functions related to the features of the present embodiment will be described later.

The second control system 120 includes an electronic control unit (hereinafter, also referred to as "BODY-ECU") 50 for controlling accessories. The second control system 120 includes a rain sensor 60 and a wiper switch 80, which are connected to inputs of the BODY-ECU 50. The second control system 120 further includes a windshield wiper 70 connected to the output of the BODY-ECU 50.

The windshield wiper 70 is provided in the body of the vehicle M1, and is a device for wiping the outer surface of the windshield. The rain sensor 60 detects rainfall of the external environment at the position of the vehicle M1. The rain sensor 60 is installed, for example, on the back side of the windshield near the room mirror. The rain sensor 60 detects rainfall when, for example, a position at which the wiper switch 80 described later stops (hereinafter, also referred to as a "wiper switch position") is in an "auto-wiper position" described later. The rain sensor 60 transmits the detected information (hereinafter, also referred to as "rainfall information") to the BODY-ECU 50 at any time.

The BODY-ECU 50 corresponds to the second controller of the vehicle control system 100. The BODY-ECU 50 is a microcomputer including a processor, memories, and input/output interfaces. The BODY-ECU 50 receives the rainfall information from the rain sensor 60 and the operating information from the wiper switch 80 via the input/output interfaces. The BODY-ECU 50 controls the operation of the windshield wiper 70 based on the received data.

1-2. Wiper Control

Figure 2:
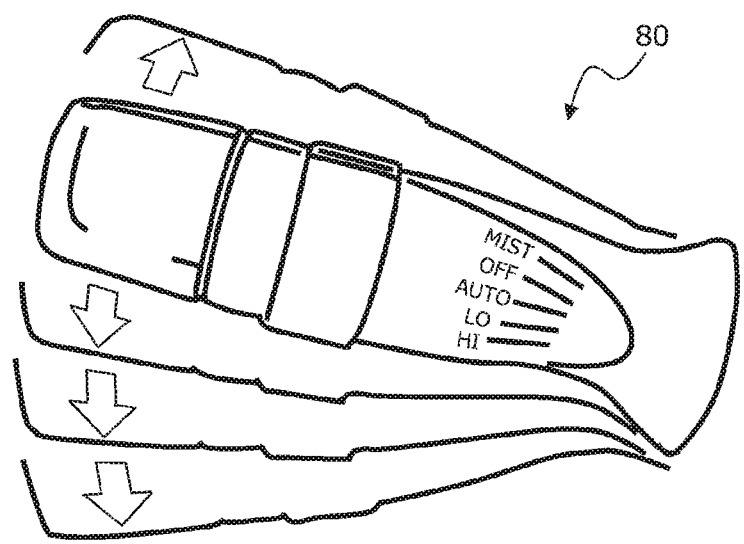
FIG. 2 is a schematic diagram showing a configuration example of a wiper switch.

The control performed by the BODY-ECU 50 includes wiper control for controlling the wiping operation of the windshield wiper 70. FIG. 2 is a schematic diagram showing a configuration example of the wiper switch. The wiper switch 80 shown in FIG. 2 is arranged in the steering column of the vehicle M1. The wiper switch 80 is a device for manually operating the wiping mode of the windshield wiper 70. As shown in FIG. 2, five wiper switch positions are provided in the wiper switch 80. The positions of "MIST", "OFF", "AUTO", "LO" and "HI" shown in FIG. 2 correspond to these wiper switch positions. In the following explanation, the positions of "LO" and "HI" among the wiper switch positions are also denoted as "wiper-on position", the position of "AUTO" is also denoted as "auto-wiper position", and the position of "OFF" is also denoted as "wiper-off position".

The wiping operation of the windshield wiper 70 is performed by changing the wiper switch position. Note that the "MIST" position is a position that can be used only while the wiper switch 80 is pushed upward from the "wiper-off position", and automated returns to the "wiper-off position" when the hand is released from the wiper switch 80.

When the wiper switch position is in the "MIST" position, a wiper-mist signal is transmitted from the wiper switch 80 to the BODY-ECU 50. When the wiper switch position is in the "wiper-off position", a wiper-off signal is transmitted from the wiper switch 80 to the BODY-ECU 50. When the wiper switch position is in the "auto-wiper position", an auto-wiper signal is transmitted from the wiper switch 80 to the BODY-ECU 50. When the wiper switch position is in the "LO" or "HI" position, wiper-on signals corresponding to the respective positions are transmitted from the wiper switch 80 to the BODY-ECU 50.

The BODY-ECU 50 controls the wiping operation by the windshield wiper 70 based on the input signal from the wiper switch 80 and the rainfall information. When the wiper-off signal is inputted from the wiper switch 80, the BODY-ECU 50 stops the wiping operation by the windshield wiper 70. When the wiper-mist signal is inputted from the wiper switch 80, the BODY-ECU 50 executes the wiping operation by the windshield wiper 70 a predetermined number of times. In this case, the cleaning liquid is sprayed onto the windshield in synchronization with the wiping operation by the windshield wiper 70.

The BODY-ECU 50 includes an auto-wiper processing unit 52 as a functional block for executing an auto-wiper process. When the auto-wiper signal is inputted from the wiper switch 80, the auto-wiper processing unit 52 of the BODY-ECU 50 executes the auto-wiper process for controlling the wiping operation by the windshield wiper 70 based on the input rainfall information.

When the wiper-on signal is inputted from the wiper switch 80, the BODY-ECU 50 executes a wiping operation in accordance with the corresponding wiper-on signal. Specifically, when the wiper-on signal is a signal corresponding to the "LO" position, the wiping operation of the windshield wiper 70 is performed at a low speed. On the other hand, when the wiper-on signal is a signal corresponding to the "HI" position, the wiping operation of the windshield wiper 70 is performed at high speed.

1-3. Features of the Vehicle Control System According to the First Embodiment Since the wiper switch 80 of the vehicle M1 is arranged in the steering column, the driver may unintentionally touch it. If the wiper switch position is switched to the wiper-off position by such an erroneous operation, there is a possibility that the windshield wiper 70 does not operate even if rain falls out during the automated driving. In this case, it is difficult to continue the automated driving because the front visibility may not be clearly obtained, and a request for switching to the manual operation is issued. However, there is a problem that the driver may not change driving with a sense of security in a situation where the forward visibility is not obtained.

Therefore, when the wiper switch position during automated driving is the wiper-off position, the vehicle control system 100 according to the first embodiment executes a compulsory auto-wiper control for compulsorily executing the auto-wiper process.

Figure 3:
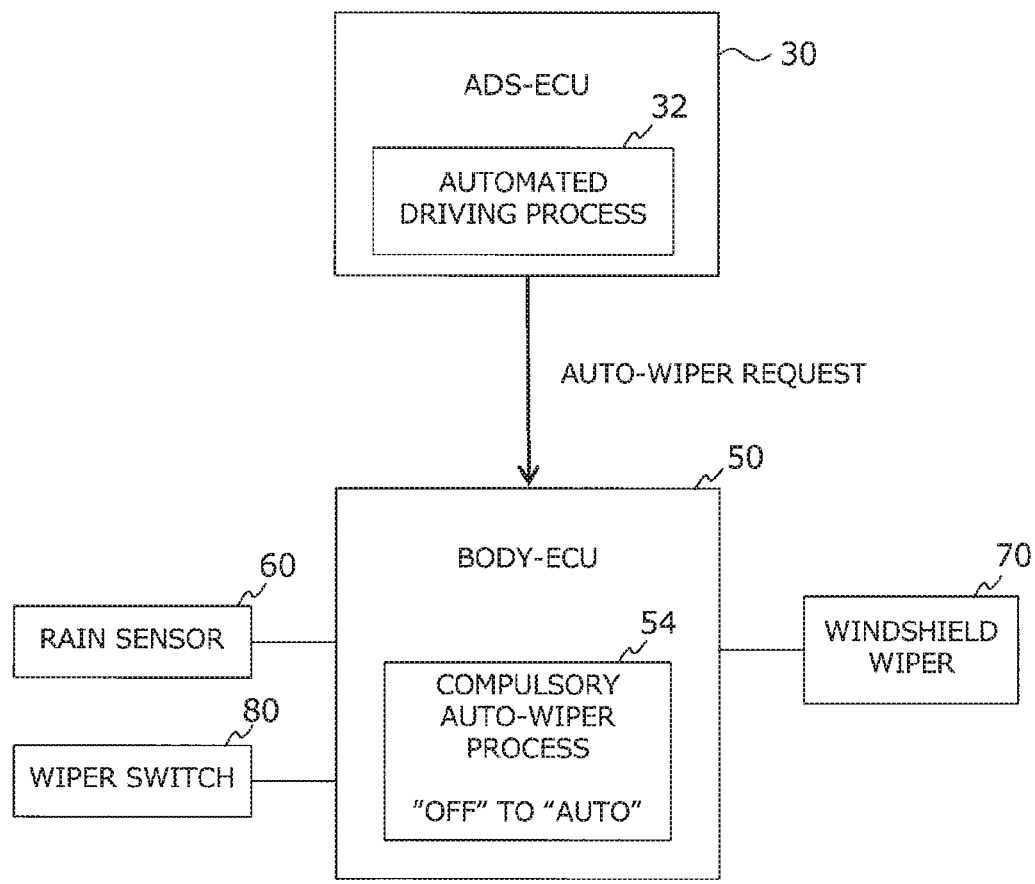
FIG. 3 is a functional block diagram of the vehicle control system for performing a compulsory auto-wiper control according to the first embodiment.

FIG. 3 is a functional block diagram of the vehicle control system for executing the compulsory auto-wiper control. As shown in the drawing, the ADS-ECU 30 includes the above-described automated driving processing unit 32. The BODY-ECU 50 includes a compulsory auto-wiper processing unit 54. The compulsory auto-wiper control is executed by the cooperation of the first control system 110 including the ADS-ECU 30 and the second control system 120 including the BODY-ECU 50. Hereinafter, a specific process of the compulsory auto-wiper control executed by the vehicle control system according to the first embodiment will be described with reference to a flow chart.

1-4. Specifically Process of Compulsory Auto-Wiper Control

Figure 4:
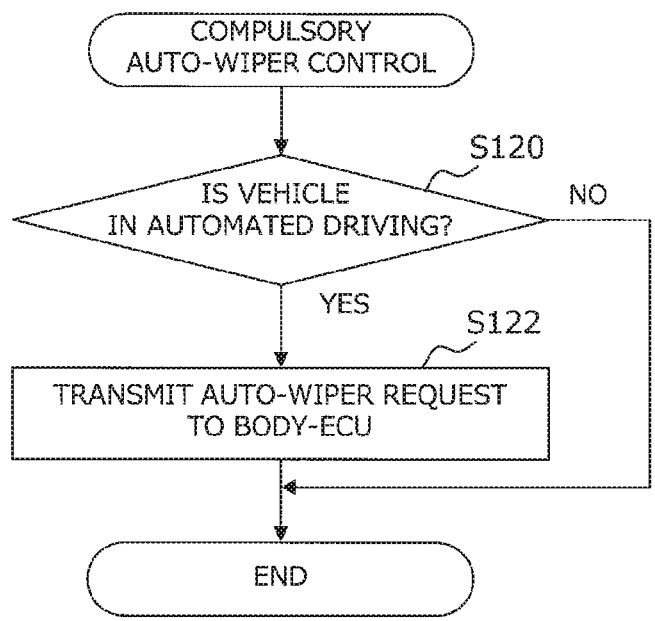
FIG. 4 is a flow chart showing a control routine executed by an ADS-ECU in the compulsory auto-wiper control according to the first embodiment.
Figure 5:
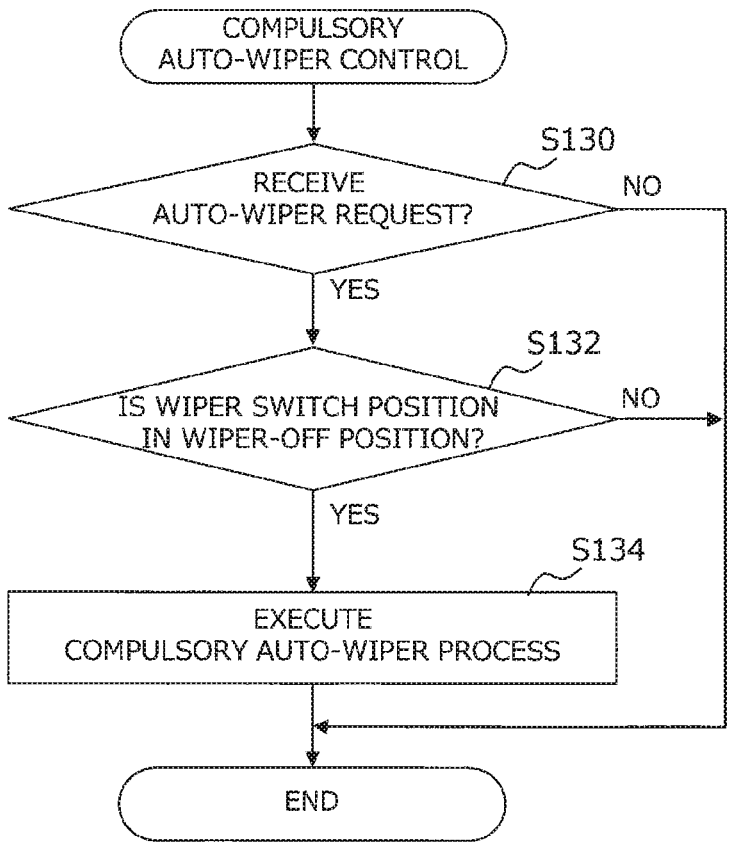
FIG. 5 is a flow chart of a control routine executed by a BODY-ECU in the compulsory auto-wiper control according to the first embodiment.

FIG. 4 is a flow chart showing control routine executed by the ADS-ECU in the compulsory auto-wiper control. FIG. 5 is a flow chart of control routine executed by the BODY-ECU in the compulsory auto-wiper control.

The routine shown in FIG. 4 is repeatedly executed in the automated driving processing unit 32 of the ADS-ECU 30 at a predetermined control cycle while the vehicle M1 is traveling. First, the ADS-ECU 30 determines whether the vehicle M1 is in the automated driving (step S120). As a result, if the determination is not satisfied, it is determined that the operation of the wiper switch 80 by the driver should be respected, and the control routine is terminated. On the other hand, if the determination is successful, the ADS-ECU 30 transmits an auto-wiper request to the BODY-ECU 50 (step S122). When the process of step S122 is completed, the control routine is terminated.

The routine shown in FIG. 5 is repeatedly executed in the compulsory auto-wiper processing unit 54 of the BODY-ECU 50 at a predetermined control cycle while the vehicle M1 is traveling. First, the BODY-ECU 50 determines whether the auto-wiper request has been received from the ADS-ECU 30 (step S130). As a result, if the determination is not established (NO in step S130), the control routine is terminated. On the other hand, if the determination is successful (YES in step S130), the BODY-ECU 50 determines whether or not the wiper switch position is the "wiper-off position" (step S132). Here, the BODY-ECU 50 determines whether or not the wiper-off signal is inputted from the wiper switch 80. As a result, when the determination is successful (YES in step 132), it is determined that the windshield wiper 70 does not operate even in the rainfall area, and the auto-wiper process for operating or stopping the windshield wiper 70 in accordance with the rainfall information is compulsorily executed (step S134). Here, the BODY-ECU 50 executes the above-described auto-wiper process. When the process of step S134 is completed, the control routine is terminated.

On the other hand, if the determination is not satisfied in the process of the above-mentioned step S132, it can be determined that the wiper switch position is the "wiper-on position" or the "auto-wiper position". In this case, since the windshield wiper 70 is always operated in the rain zone, the present control routine is terminated.

As described above, according to the vehicle control system of the first embodiment, the first control system 110 including the ADS-ECU 30 and the second control system 120 including the BODY-ECU 50 cooperate with each other to prevent the windshield wiper 70 from not operating at the time of rainfall during the automated driving. As a result, the front visibility may be clearly obtained even in the event of rainfall, and therefore it is possible to prevent the continuation of the automated driving from becoming difficult. In such a situation, even if a request for switching to the manual operation is issued, the driver may change the operation with a sense of security.

1-4. Modified Examples

The vehicle control system 100 according to the first embodiment may adopt a modified embodiment as described below.

Figure 6:
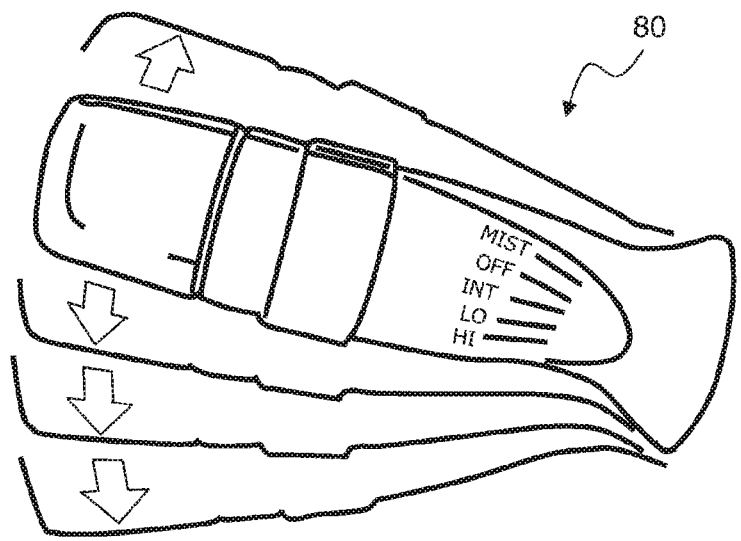
FIG. 6 is a schematic diagram showing another configuration example of the wiper switch.

The wiper switch 80 may have an "intermittent position" for intermittently driving the windshield wiper 70 as an operable wiper switch position. FIG. 6 is a schematic diagram showing another configuration example of the wiper switch. As shown in FIG. 6, the wiper switch 80 has five wiper switch positions of "MIST", "OFF", "INT", "LO", and "HI". Among these wiper switch positions, the position of "INT" corresponds to the "intermittent position".

When the wiper switch position is in the "intermittent position", the wiper switch 80 transmits an int signal to the BODY-ECU 50.

In the compulsory auto-wiper control of the vehicle M1 provided with the wiper switch 80 shown in FIG. 6, the BODY-ECU 50 may determine whether or not the wiper switch position is in the "wiper-off position" or the "intermittent position" in step S132 of the control routine shown in FIG. 5. According to such a control, the first control system 110 including the ADS-ECU 30 and the second control system 120 including the BODY-ECU 50 may cooperate with each other. Thereby, it is possible to prevent the windshield wiper 70 from being unable to perform an operation with a higher wiping frequency than the intermittent operation at the time of rainfall during the automated operation. As a result, the front visibility may be clearly obtained even in the event of rainfall, and therefore it is possible to prevent the continuation of the automated driving from becoming difficult. In such a situation, even if a request for switching to the manual operation is issued, the driver can change the operation with a sense of security.

In the vehicle control system 100 according to the first embodiment, the SAE level of the automated driving to be realized is not limited as long as the first control system 110 and the second control system operate in cooperation during the automated driving.

2. Second Embodiment

Next, the vehicle control system according to the second embodiment will be described with reference to the drawings.

2-1. Configuration of Vehicle Control System According to Second Embodiment

The configuration of the vehicle control system according to second embodiment is the same as that of the vehicle control system 100 of the first embodiment shown in FIG. 1. The detailed configuration of the vehicle control system according to the second embodiment is omitted.

2-2. Characteristic Functions of Vehicle Control System According to Second Embodiment In automatic driving at level 3 or higher in the SAE level definition, the second task is permitted for the driver. For this reason, in the automated driving at the level 3 or higher, the possibility that the driver unintentionally touches the wiper switch 80 is increased as compared with the case of the manual operation. If the wiping operation of the windshield wiper 70 for securing the front visibility is obstructed by the erroneous manual operation of the wiper switch 80, it becomes difficult to continue the automated driving, and a request for switching to the manual operation is issued. However, in a situation where the forward visibility is not obtained, the driver may not change driving with a sense of security.

Therefore, the vehicle control system of the second embodiment executes a specific operation rejection control for rejecting the manual specific operation of the wiper switch 80 when it is determined that the vehicle is in the automated driving state. The specific operation herein includes the operation of the wiper switch 80 to the "wiper-off position".

Figure 7:
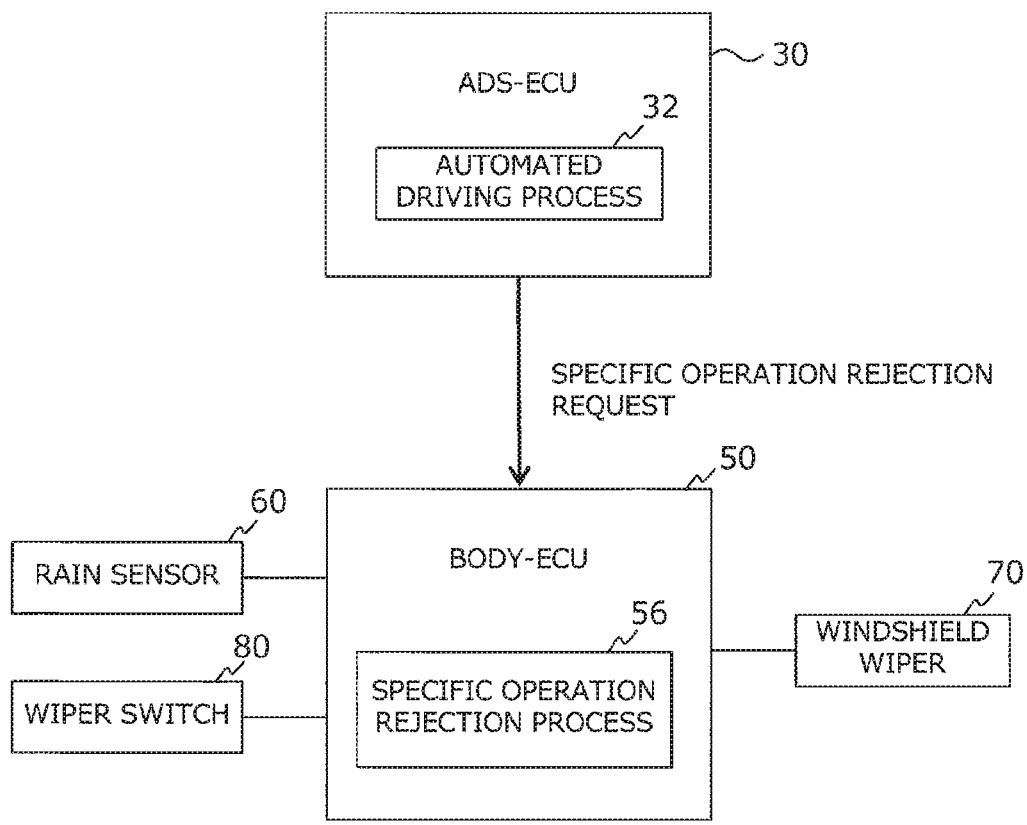
FIG. 7 is a functional block diagram of the vehicle control system for executing a specific operation rejection control according to a second embodiment.

FIG. 7 is a functional block diagram of the vehicle control system for executing the specific operation rejection control.

As shown in the drawing, the ADS-ECU 30 includes the above-described automated driving processing unit 32. The BODY-ECU 50 includes a specific operation rejection processing unit 56. The specific operation rejection control is executed by the cooperation between the ADS-ECU 30 included in the first control system 110 and the BODY-ECU 50 included in the second control system 120. Hereinafter, a specific process executed in the specific operation rejection control will be described with reference to a flow chart.

2-3. Specifically Process of Specific Operation Rejection Control

Figure 8:
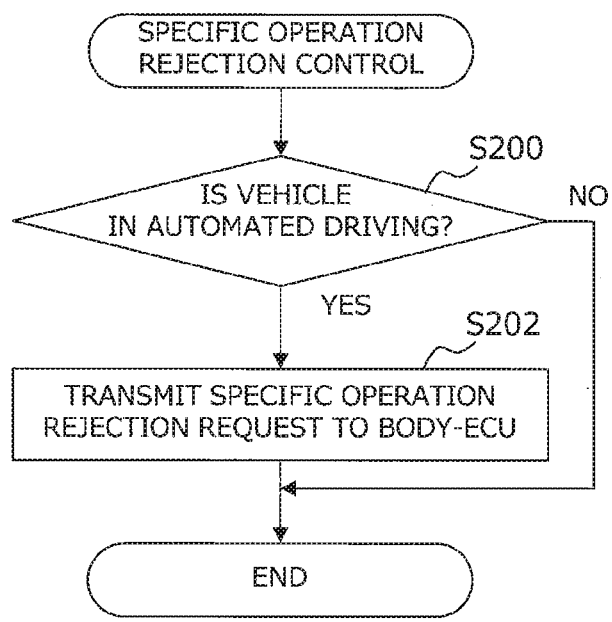
FIG. 8 is a flow chart showing a control routine executed by the ADS-ECU in the specific operation rejection control according to the second embodiment.
Figure 9:
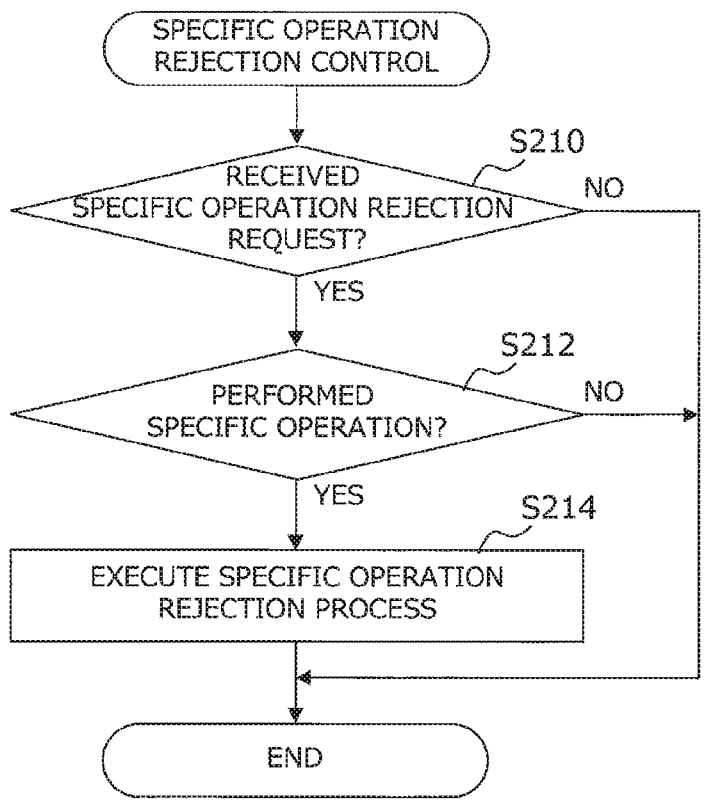
FIG. 9 is a flow chart showing a control routine executed by the BODY-ECU in the specific operation rejection control of the second embodiment.

FIG. 8 is a flow chart showing a control routine executed by the ADS-ECU in the specific operation rejection control. FIG. 9 is a flow chart of a control routine executed by the BODY-ECU in the specific operation rejection control.

The routine shown in FIG. 8 is repeatedly executed in the automated driving processing unit 32 of the ADS-ECU 30 at a predetermined control cycle while the vehicle M1 is traveling. First, the ADS-ECU 30 determines whether the vehicle M1 is in the automated driving (step S200). As a result, if the determination is not satisfied, it is determined that the operation of the wiper switch 80 by the driver should be respected, and the control routine is terminated. On the other hand, if the determination is successful, the ADS-ECU 30 transmits a specific operation rejection request to the BODY-ECU 50 (step S202). When the process of step S202 is completed, the control routine ends.

The routine shown in FIG. 5 is repeatedly executed in the specific operation rejection processing unit 56 of the BODY-ECU 50 at a predetermined control cycle while the vehicle M1 is traveling. First, the BODY-ECU 50 determines whether the specific operation rejection request has been received from the ADS-ECU 30 (step S210). As a result, if the determination is not established (NO in step S210), the control routine is terminated. On the other hand, if the determination is successful, the BODY-ECU 50 determines whether or not a specific operation has been performed by the wiper switch 80 (step S212). Specifically, it is determined whether or not a signal indicating the operation of the wiper switch 80 to the "wiper-off position" or the "intermittent position" is inputted from the wiper switch 80. As a result, if the determination is not established (NO in step S212), the control routine is terminated. On the other hand, if the determination is successful (YES in step S212), the BODY-ECU 50 executes the specific operation rejection process (step S214). Here, the BODY-ECU 50 rejects to change the operation of the windshield wiper 70 based on the signals of the particular operation. That is, the BODY-ECU 50 does not accept the change of the operation of the windshield wiper 70 based on the signals of the particular operation, and continues the present operation. When the process of step S214 is completed, this routine is terminated.

As described above, according to the vehicle control system 100 of the second embodiment, it is possible to rejects the operation of the windshield wiper 70 to the off-position at the time of the automated operation by the cooperation of the ADS-ECU 30 and the BODY-ECU 50. As a result, it is possible to prevent a situation in which the windshield wiper 70 is unintentionally changed in the wiping operation during the automated driving and the front visibility cannot be obtained.

2-4. Modified Examples

The vehicle control system of the 2 embodiment may adopt a modified embodiment as described below.

In the vehicle control system of the second embodiment, the compulsory auto-wiper control executed in the vehicle control system 100 of the first embodiment may be executed together with the specific operation rejection control.

In a system including a wiper switch having an "intermittent position" as a manually switchable wiper switch position, such as the wiper switch 80 shown in FIG. 6, the specific operation may include the operation of the windshield wiper 70 to the "intermittent position".

What is claimed is:

1. A vehicle control system installed on a vehicle,
the vehicle including a windshield wiper switch for manually operating a wiping mode of a windshield wiper installed on a body, the wiper switch including a wiper-on position for driving the windshield wiper and a wiper-off position for stopping the windshield wiper, the system comprising:
a first controller configured to execute an automated driving of the vehicle; and
a second controller configured to control the wiping mode of the windshield wiper based on a request from the first controller or operation information of the wiper switch,
wherein:
the first controller is configured to transmit, during execution of the automated driving, an auto-wiper request to the second controller for executing a compulsory auto-wiper process for automatically switching the wiping mode of the windshield wiper according to an external environment;
the second controller is configured to execute the compulsory auto-wiper process when the auto-wiper request is received from the first controller in a state where the wiper switch is operated to the wiper-off position;
the first controller is further configured to transmit, during execution of the automated driving, a specific operation rejection request for executing a specific operation rejection process for rejecting a control of the windshield wiper based on a specific operation to the second controller;
the specific operation includes an operation of the wiper switch to the wiper-off position;
the second controller is further configured to execute the specific operation rejection process when the specific operation rejection request is received from the first controller;
the compulsory auto-wiper process is executed together with the specific operation rejection process; and
the second controller is separate from the first controller.

2. A vehicle control system installed on a vehicle,
the vehicle including a windshield wiper switch for manually operating a wiping mode of a windshield wiper installed on a body, the wiper switch including a wiper-on position for driving the windshield wiper and a wiper-off position for stopping the windshield wiper,
the vehicle control system comprising:
a first controller configured to execute an automated driving of the vehicle; and
a second controller configured to control the wiping mode of the windshield wiper based on a request from the first controller or operation information of the wiper switch,
wherein:
the first controller is configured to transmit, during execution of the automated driving, an auto-wiper request to the second controller for executing a compulsory auto-wiper process for automatically switching the wiping mode of the windshield wiper according to an external environment;
the second controller is configured to execute the compulsory auto-wiper process when the auto-wiper request is received from the first controller in a state where the wiper switch is operated to the wiper-off position;
the wiper switch further includes an intermittent position for intermittently driving the windshield wiper;
the second controller is configured to execute the auto-wiper process when the auto-wiper request is received from the first controller in a state where the wiper switch is operated to the intermittent position;
the first controller is configured to transmit, during execution of the automated driving, a specific operation rejection request for executing a specific operation rejection process for rejecting a control of the windshield wiper based on a specific operation to the second controller;
the specific operation includes an operation of the wiper switch to the intermittent position or the wiper-off position;
the second controller is configured to execute the specific operation rejection process when the specific operation rejection request is received from the first controller;
the compulsory auto-wiper process is executed together with the specific operation rejection process; and
the second controller is separate from the first controller.

* * * * *